(12) United States Patent
Guo et al.

(10) Patent No.: US 10,645,561 B1
(45) Date of Patent: *May 5, 2020

(54) METHODS AND SYSTEMS FOR VEHICLE POSITION REPORTING AND EMERGENCY MESSAGING

(71) Applicant: Honeywell International Inc., Morris Plains, NJ (US)

(72) Inventors: Wen Fan Guo, Beijing (CN); Lu Ning Wang, Beijing (CN); Zhi Peng Guan, Beijing (CN); Ran Xia, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/260,493

(22) Filed: Jan. 29, 2019

(51) Int. Cl.
| | | |
|---|---|---|
| *G01S 19/52* | (2010.01) | |
| *H04W 4/90* | (2018.01) | |
| *H04W 4/40* | (2018.01) | |
| *G07C 5/00* | (2006.01) | |
| *H04B 7/185* | (2006.01) | |

(52) U.S. Cl.
CPC .............. *H04W 4/90* (2018.02); *G01S 19/52* (2013.01); *G07C 5/008* (2013.01); *H04B 7/18513* (2013.01); *H04W 4/40* (2018.02)

(58) Field of Classification Search
CPC .......... G01S 19/07; G01S 19/00; G01S 19/38; G01S 19/39; G01S 19/42; B64D 45/0059
See application file for complete search history.

(56) References Cited

U.S. PATENT DOCUMENTS

| | | | | |
|---|---|---|---|---|
| 2016/0014586 A1* | 1/2016 | Stupar | ..................... | H04W 4/90 455/404.2 |
| 2018/0234935 A1* | 8/2018 | Uchiyama | .............. | H04W 56/00 |
| 2018/0286258 A1* | 10/2018 | Derbanne | .............. | G08G 1/164 |
| 2019/0152282 A1* | 5/2019 | Spengler | .................. | B60D 1/64 |

FOREIGN PATENT DOCUMENTS

| | | |
|---|---|---|
| CN | 103279462 B | 9/2013 |
| CN | 102073056 A | 3/2018 |
| CN | 107861136 A | 3/2018 |

* cited by examiner

*Primary Examiner* — Liton Miah
(74) *Attorney, Agent, or Firm* — Bookoff McAndrews, PLLC

(57) ABSTRACT

Disclosed are methods, systems, and non-transitory computer-readable medium for vehicle information reporting of a vehicle using Global Navigation Satellite System (GNSS) receivers and a satellite communication transceiver for a satellite system. For instance, the method may include obtaining GNSS data to determine position, altitude, speed, track, or vertical rate information for the vehicle; receiving inputs from timers, sensors, or a user interface of the vehicle; determining whether to transmit a message based on rules applied to the obtained GNSS data and the received inputs; in response to determining to transmit the message, compiling the message based on a message content rule, the message being configurable with respect to a maximum size of a radio-determination-satellite service (RDSS) message of the satellite system, the message including an emergency message when the rules indicate an emergency situation; and transmitting the message via the satellite communication transceiver to a satellite of the satellite system.

20 Claims, 14 Drawing Sheets

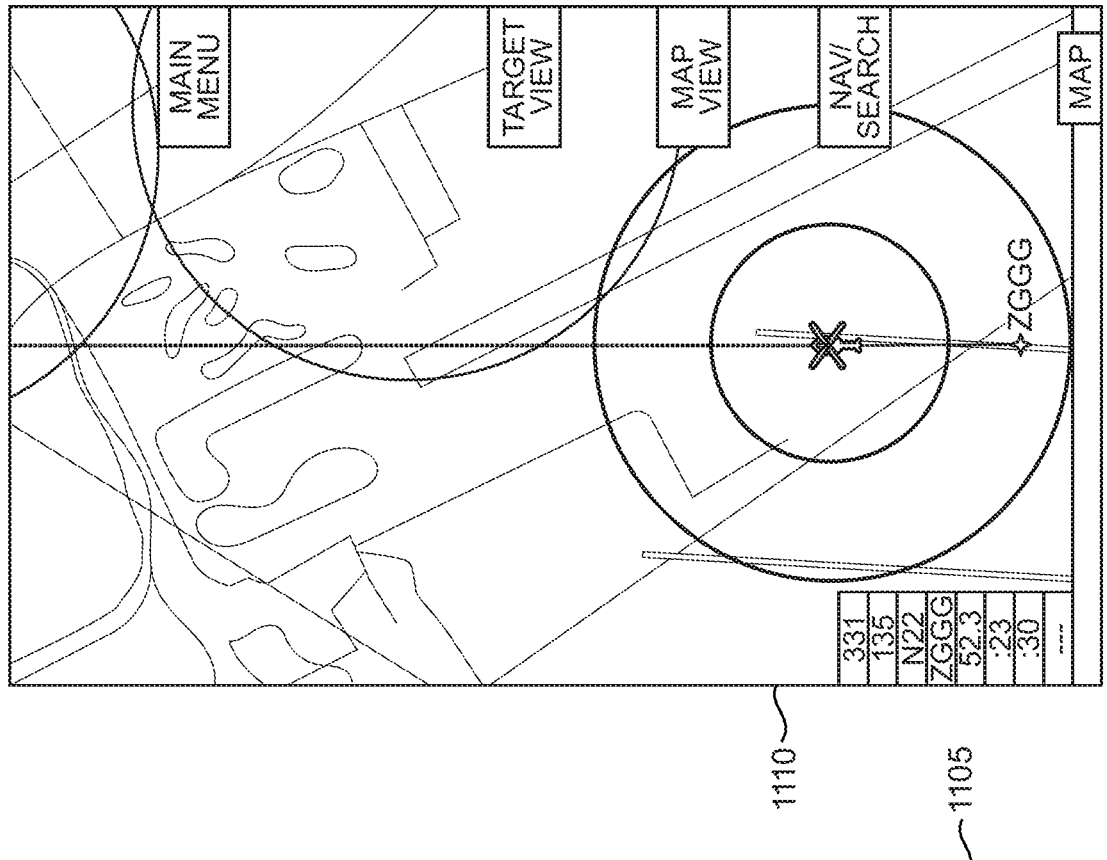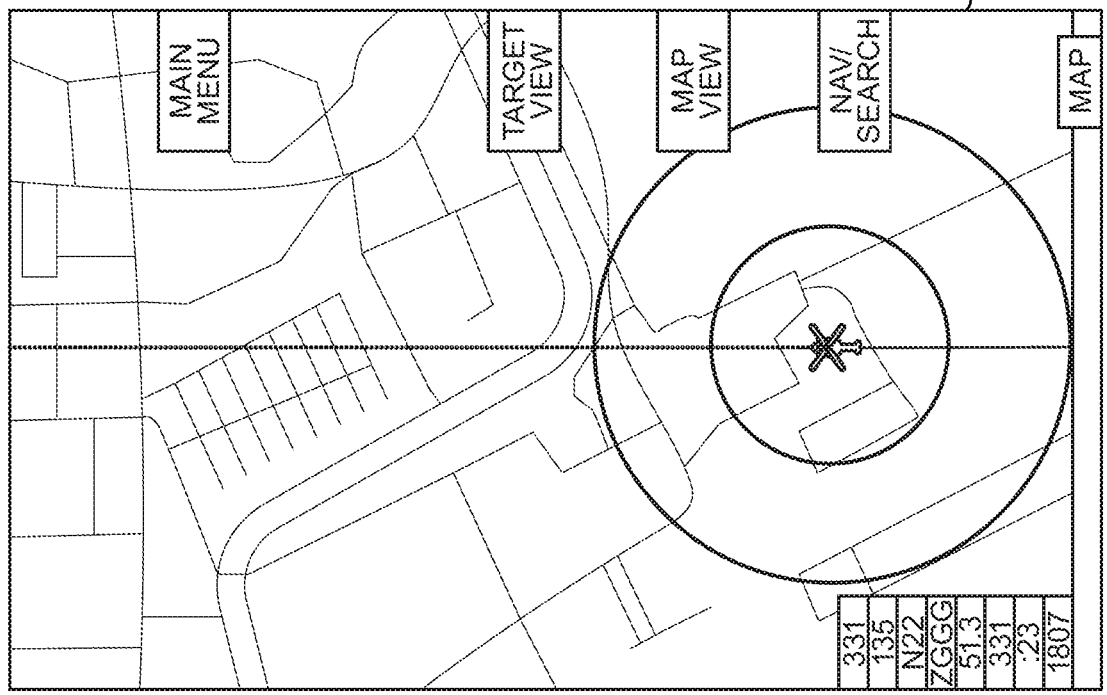
FIG. 11

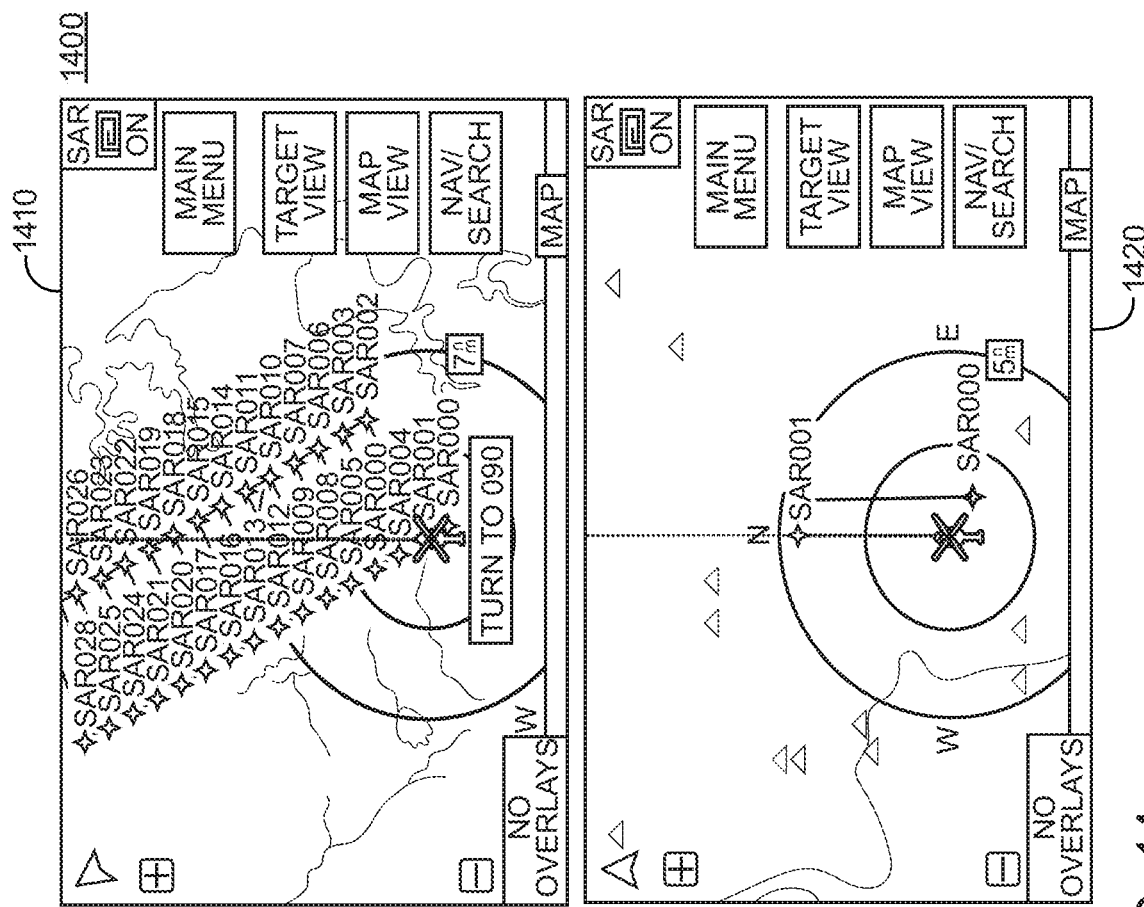
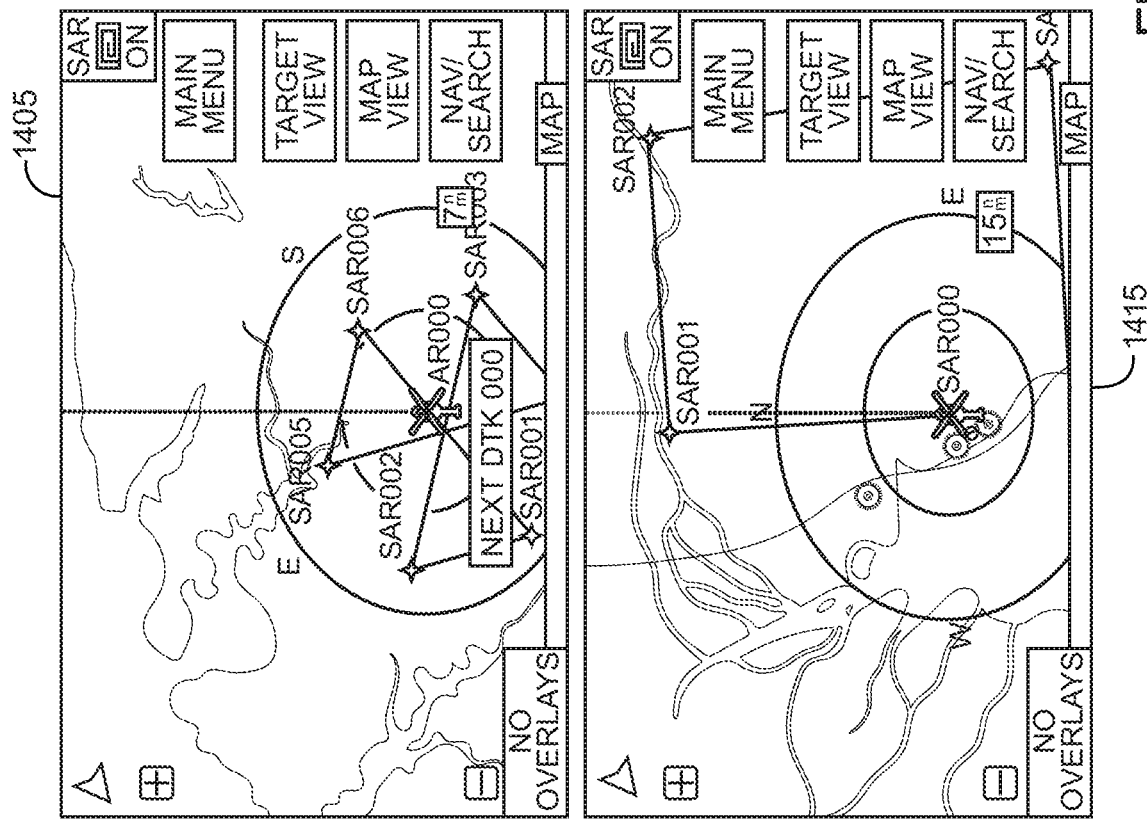
FIG. 14

METHODS AND SYSTEMS FOR VEHICLE POSITION REPORTING AND EMERGENCY MESSAGING

CROSS-REFERENCE TO RELATED APPLICATIONS

This application is related to co-pending U.S. patent application Ser. No. 16/260,586, entitled "METHODS AND SYSTEMS FOR VEHICLE POSITION REPORTING AND MANAGING HISTORICAL POSITION INFORMATION,", which was filed on Jan. 29, 2019 and incorporated by reference in its entirety.

TECHNICAL FIELD

Various embodiments of the present disclosure relate generally to vehicle information reporting and, more particularly, to methods and systems for position reporting and emergency messaging.

BACKGROUND

Generally, satellite communications systems may provide a maximum message length for each transmission and a set period for transmission that may not accommodate more frequent transmissions. For instance, the Chinese developed Beidou system provides a radio-navigation-satellite service (RNSS) as well as radio-determination-satellite service (RDSS). RNSS may be used for global positioning by receiving devices (e.g., for basic navigation service for positioning, velocity, and trimming), and the RNSS provided by the Beidou system may be similar to that provided by the United States developed GPS and European Union developed Galileo systems. However, the RDSS service offered by the Beidou system is a unique global navigation satellite system (GNSS) constellation. The Beidou RDSS service includes rapid positioning, short-messaging, and precision timing via geostationary (GEO) satellites for users in China and surrounding areas, and eventually globally, as the most recent phase expands on the Beidou system. However, since the Beidou RNSS service offers better passive positioning and time performance, the short-message service may be the most useful feature in the Beidou RDSS service. Moreover, the Beidou RDSS service is a two-way communication among users and between users and ground control stations, with a message size limit of up to 120 bytes, 60 Chinese Characters, per message. Therefore, like general satellite communications systems, the Beidou system has a maximum message length for each transmission and a maximum frequency of transmission, and users of such systems may need to decide what, if any, of certain classes of information will be transmitted.

Moreover, the general aviation ("GA") environment in China has steadily grown and will continue to grow. To regulate and promote this growth, the Civil Aviation Administration of China (CAAC), has promulgated a guiding opinion on the Application of Low Altitude Airspace Surveillance Technology in Civil Aviation to accelerate the application of new technologies, such as the BeiDou system and Automatic Dependent Surveillance-Broadcast (ADS-B) in the low-altitude airspace of China. For instance, the CAAC has encouraged the GA market to use "BeiDou+ GPS" as the positioning data source and adopt the BeiDou short message for positioning information transmission.

However, as mentioned above, there is a maximum message length for each transmission and a maximum frequency of transmission for the Beidou system. Therefore, to ensure safety and transmission of useful information, there is a need for procedures to efficiently make use of the Beidou system and, more generally, any satellite communications system.

For instance, one problem with respect to general reporting of information from a vehicle is determining (1) which types of information to store on board the vehicle; (2) how much of that information should be stored on board in view of the limited message size and the limited transmission frequency of a satellite communications system; and (3) how much to transmit off-board the vehicle. Another problem with respect to emergency situations is determining (1) which types of information should be transmitted; (2) when should the various types of information be transmitted; (3) and what type of user input should be involved.

Moreover, there are other general problems facing pilots/vehicle operators in the GA environment of China, such as: (1) little or no public access to visual flight rules (VFR) charts for GA flying in China; (2) pilots on a long-distance flights lack means for a low-altitude terrain warning information system, lack means for reporting of weather information and advisory information, and lack affordable means for position reporting, tracking, and communication; and (3) because the BeiDou system has a low communication service frequency and a small maximum message size, users are concerned about whether to store historical location data and/or transmit some historical location data in a packet that is transmitted.

The present disclosure is directed to overcoming one or more of these above-referenced challenges.

SUMMARY OF THE DISCLOSURE

According to certain aspects of the disclosure, systems and methods are disclosed for vehicle information reporting.

For instance, a method may include obtaining GNSS data to determine position information, altitude information, speed information, track information, or vertical rate information for the vehicle, the obtained GNSS data being received by the GNSS receivers; receiving inputs from timers, sensors, or a user interface of the vehicle; determining whether to transmit a message based on rules applied to the obtained GNSS data and the received inputs; in response to determining to transmit the message, compiling the message based on a message content rule, the message being configurable with respect to a maximum size of a radio-determination-satellite service (RDSS) message of the satellite system, the message including an emergency message when the rules indicate an emergency situation; and transmitting the message via the satellite communication transceiver to a satellite of the satellite system.

A system may include a memory storing instructions; and a processor executing the instructions to perform a process. The process may include: obtaining GNSS data to determine position information, altitude information, speed information, track information, or vertical rate information for the vehicle, the obtained GNSS data being received by the GNSS receivers; receiving inputs from timers, sensors, or a user interface of the vehicle; determining whether to transmit a message based on rules applied to the obtained GNSS data and the received inputs; in response to determining to transmit the message, compiling the message based on a message content rule, the message being configurable with respect to a maximum size of a radio-determination-satellite service (RDSS) message of the satellite system, the message including an emergency message when the rules indicate an emergency situation; and transmitting the message via the satellite communication transceiver to a satellite of the satellite system.

A non-transitory computer-readable medium may store instructions that, when executed by a processor, cause the processor to perform a method. The method may include: obtaining GNSS data to determine position information, altitude information, speed information, track information, or vertical rate information for the vehicle, the obtained GNSS data being received by the GNSS receivers; receiving inputs from timers, sensors, or a user interface of the vehicle; determining whether to transmit a message based on rules applied to the obtained GNSS data and the received inputs; in response to determining to transmit the message, compiling the message based on a message content rule, the message being configurable with respect to a maximum size of a radio-determination-satellite service (RDSS) message of the satellite system, the message including an emergency message when the rules indicate an emergency situation; and transmitting the message via the satellite communication transceiver to a satellite of the satellite system.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 11 depicts an exemplary graphical user interface to explain a function of a system for vehicle information reporting, according to one or more embodiments.

FIG. 14 depicts an exemplary graphical user interface to explain a function of a system for vehicle information reporting, according to one or more embodiments.

DETAILED DESCRIPTION OF EMBODIMENTS

Figure 1:
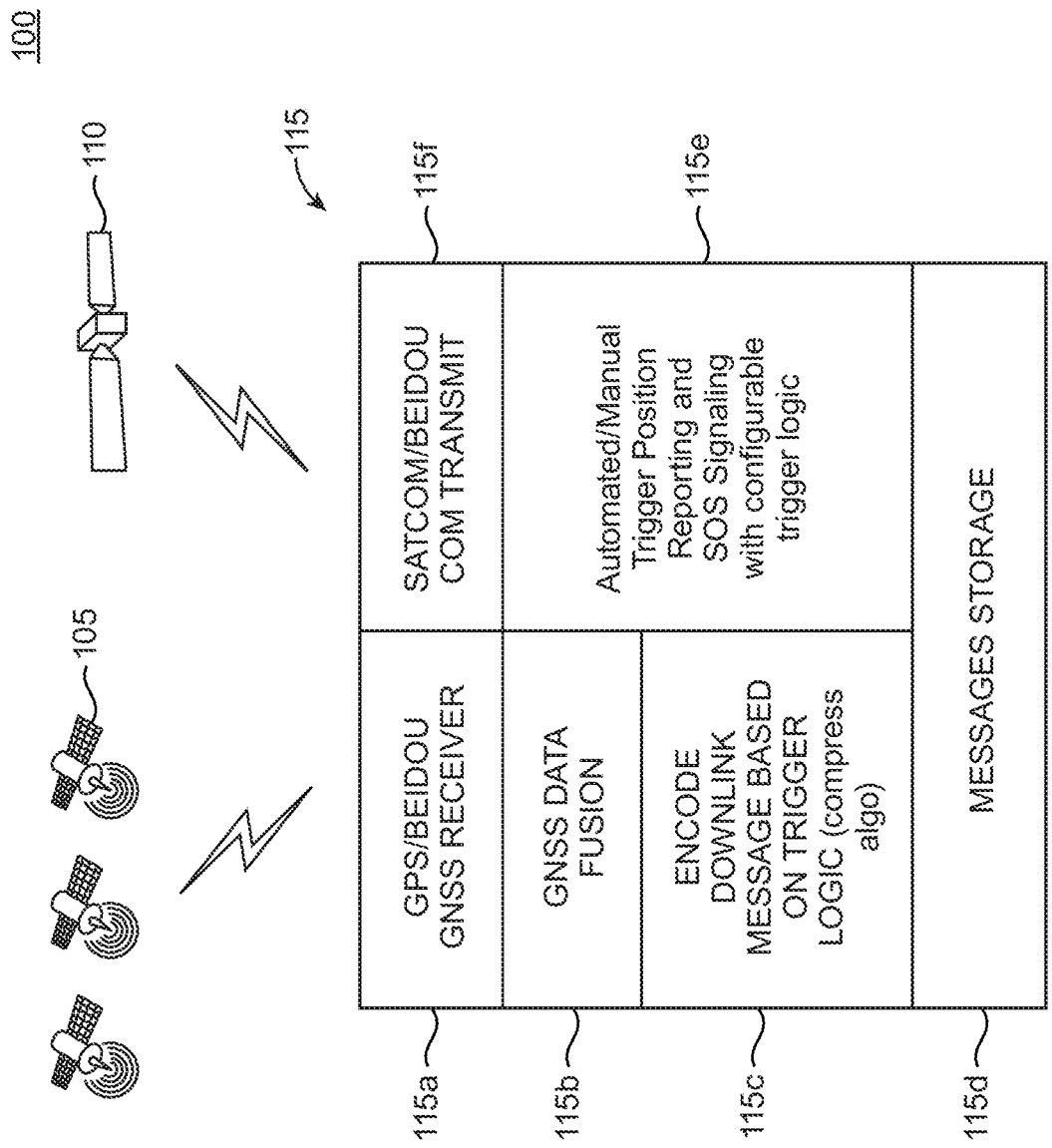
FIG. 1 depicts an exemplary block diagram of a system for vehicle information reporting, according to one or more embodiments.

Various embodiments of the present disclosure relate generally to vehicle information reporting and, more particularly, to methods and systems for position reporting and emergency messaging.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

While this disclosure describes the systems and methods with reference to aircraft, it should be appreciated that the present systems and methods are applicable to reporting vehicle information of a vehicle, including those of drones, automobiles, ships, or any other autonomous and/or Internet-connected vehicle.

In general, the present disclosure is directed to reporting vehicle information reporting. Larger aircraft have generally transmitted position information as a means to reduce the likelihood of mid-air collision (see, e.g., TCAS systems and ADS-B) and/or to reduce a delay in a search and rescue operations. However, even larger aircraft require efficient use of limited message sizes and limited transmission frequency of messages of general satellite communications systems. Furthermore, VFR flights of aircraft generally do not report position information. As discussed below, a processor of a vehicle communications system may receive and store positioning information, determine whether to transmit a message based on a first set of rules, and if so, compile a message based on a second set of rules. For instance, the processor may determine to transmit a message when the first set of rules indicate an emergency. Furthermore, the processor may determine to transmit a message that includes historical positioning information when a second set of rules indicate the historical positioning information is to be transmitted. Therefore, the embodiments of the present disclosure may ensure efficient utilization of the RDSS service of any satellite communications system, like the Beidou system, and solve several problems discussed above, like (1) efficient position reporting and emergency messaging and/or (2) storage and transmission of historical positioning information.

FIG. 1 depicts an exemplary block diagram of a system for vehicle information reporting, according to one or more embodiments. The system 100 may include one or more Global Navigation Satellite (GNSS) systems 105, a satellite communication system 110, and a vehicle communications system 115.

The one or more GNSS systems 105 may include one or more of the United States developed Global Position System (GPS), the Russian developed Global Navigation Satellite System (GLONASS), the European Union developed Galileo system, or the China developed BeiDou system, or other global or regional satellite navigation systems. The one or more GNSS systems 105 may have satellites that transmit signals that can be used by a receiving device (like the vehicle communications device 115) to determine positioning information.

The satellite communication (SATCOM) system 110 may include one or more SATCOM systems provided by, e.g., Intelsat S.A., SES, Eutelsat, EchoStar, or the Beidou system. The satellite communication (SATCOM) system 110 may have satellites that may transmit/receive signals to/from transmitters/receivers/transceivers of a host device (e.g., the vehicle communications system 115) to enable communications between the host device and another network/device (e.g., the internet or a ground station).

The vehicle communications system 115 may include one or more GNSS receivers 115a, a GNSS data fusion section 115b, an encode downlink message section 115c, a messages storage section 115d, a trigger section 115e, and at least one satellite communication transceiver 115f. The vehicle communications system 115 may include a processor and a memory that stores instructions executable by the processor. The vehicle communications system 115 may be portable onto (e.g., moveable by either a person or mechanized loading) or may be fixed onto a vehicle.

The one or more GNSS receivers 115a may include one or more receivers that can receive signals from satellites of the GPS, GLONASS, Galileo, or Beidou systems, or other global or regional satellite navigation system (collectively "sources"). The one or more GNSS receivers 115a may process the received signals and output positioning information to the processor/memory of the vehicle communications system 115 or the one or more GNSS receivers 115a may provide the received signals directly to the processor of the vehicle communications system 115 so that the processor may determine the positioning information. The positioning information may include information about one or more of position (e.g., latitude and longitude, or Cartesian coordinates), altitude, speed, heading, or track for the vehicle. Furthermore, the one or more GNSS receivers 115a may include a receiver that is configured to receive signals from multiple different sources and separate the respective signals into component signals corresponding to the one or more sources.

The processor, in the GNSS data fusion section 115b, may select which GNSS source or sources of the one or more GNSS receivers to use, and may fuse the positioning information of the selected sources to determine fused positioning information. An example process to fuse the positioning information is discussed below with respect to FIG. 7.

The vehicle communications system 115 may also include timers (e.g., analog, digital, or software based), sensors (e.g., accelerometer, gyroscope, or magnetometer), and/or a user interface. Alternatively, the vehicle communication system 115 may be connected to other systems of the vehicle that have the timers, the sensors, and/or the user interface. The processor may receive inputs from the timers, the sensors, and/or the user interface, or the processor may receive data containing the inputs from the timer, the sensors, and/or the user interface.

The processor, in the trigger section 115e, may determine whether to transmit a message based on rules applied to the positioning information (either fused or not fused, called "received GNSS data") and the received inputs. For instance, the rules may be based on a time period, overspeed condition, stall condition, and/or an emergency condition. The rules may be configurable by a user the vehicle communications system 115, an owner of the vehicle communications system 115 and/or the owner of the vehicle the vehicle communications system 115 is on, or a government entity that is responsible for vehicle safety (collectively a "configuring user"). For instance, the user interface may provide information to the configuring user and the configuring user may make selections by a user input. Alternatively, the configuring user may input instructions by various methods, e.g., upload of software or an update.

For instance, a first rule may be that the processor may determine that the message is to be transmitted every start/end of a time period. The time period may be one minute, five minutes, fifteen minutes, thirty minutes, or some period of time in between one minute to thirty minutes. The time period may be tracked by the input from the timer. The configuring user may select one of these periods or enter a different period of time.

A second rule may be that the processor may determine that the message is to be transmitted when a ground speed based on the received GNSS data is over a threshold speed. The ground speed may be calculated based on a change in longitude and latitude versus a change in time or based on the positioning information. The configuring user may adjust the threshold speed.

A third rule may be that the processor may determine that the message is to be transmitted when a first user input into the user interface indicating an emergency is received by the processor. The first user input into the user interface may be a hardware/physical key or the first user input may be a software based key (e.g., a functional key). Furthermore, the processor may output a confirmation message to the user interface in response to the first user input, and in response to receiving a second user input that indicates a confirmation the processor may determine that the message is to be transmitted.

A fourth rule may be that the processor may determine that the message is to be transmitted when the processor (or another on-board system) detects a track/course deviation based on a threshold difference between a track/course indicated by the received GNSS data and a planned track/course stored in the memory of vehicle communications system 115. The deviation may be determined by comparing a location indicated by the GNSS data to a location indicated by a planned track/course and a time. The configuring user may adjust the threshold distance.

A fifth rule may be that the processor may determine that the message is to be transmitted when the processor detects an over limit condition. The over limit condition may be detected by the processor when the acceleration in the X, Y, or Z direction (or some combination thereof) exceeds an acceleration threshold. The acceleration may be calculated based on (1) information from the accelerometer or (2) numerical integration of the positioning information versus time. The configuring user may adjust the acceleration threshold.

A sixth rule may be that the processor may determine that the message is to be transmitted when the processor detects a stall condition. The stall condition may be detected by the processor when the orientation of the vehicle and/or the acceleration in the X, Y, or Z direction (or some combination thereof) indicates a reduction of lift for the vehicle, which may be detected by a speed and/or an angle of attack of the vehicle (based on physical parameters of the vehicle). The acceleration may be calculated as discussed above. The orientation may be based on information from the gyroscope, magnetometer, and/or accelerometer.

A seventh rule may be that the processor may determine that the message is to be transmitted when the processor detects a time period elapsing without resetting the time period, where the resetting of the time period is performed in response to an action. The action may be a user input. Alternatively, if any of rules two through six are triggered, the time period may start; the processor may output a countdown to the user interface; and if no user input is received to stop the message within the time period, then the processor may determine that the message is to be transmitted. If a user input is received, then the emergency message may not be sent, as the user input may indicate an instruction not to transmit the emergency message.

The configuring user may enable/disable one or more of the above rules to be used by the vehicle communications system 115. For instance, the configuring user may enable the first rule and the third rule, so that the positioning information is reported every time period and in response to an emergency input. Alternatively, the configuring user may enable all rules, so that the positioning information is reported every time period, in response to an emergency input, or when one of the other conditions are triggered (as these may indicate an emergency and the user of the vehicle can not or failed to input the emergency input or the no emergency input).

In response to determining to transmit the message, the processor, in the encode downlink message section 115c, may compile the message based on a message content rule. The message content rule may be configurable with respect to a maximum size of a RDSS message of the one or more SATCOM systems. For instance, the message content rule may include editable logic that may be editable by the user the vehicle communications system 115, the owner of the vehicle communications system 115 and/or the owner of the vehicle the vehicle communications system 115 is on, or the government entity that is responsible for vehicle safety (collectively "configuring user"). For instance, the user interface may provide information to the configuring user and the configuring user may make selections by a user input. Alternatively, the configuring user may input instructions by various methods, e.g., upload of software or an update.

For instance, the editable logic may, based on the maximum size of the RDSS message, determine a message content to transmit based on which rule triggered the transmission of the message. The message may be comprised of blocks of information for time, location, track, speed, altitude, etc. The blocks for time and location may not be configurable, meanwhile a remainder of available blocks (e.g., track, speed, altitude, etc.) may be configurable, so as to be included or not based on the editable logic. For instance, the message may include a plurality of blocks. A first set of blocks of the plurality of blocks may correspond to a current time at transmission and a location of the vehicle. A second set of blocks of the plurality of blocks may correspond to a remainder of the plurality of blocks. The remainder of the plurality of blocks may be configured to be changed based on the message content rule. The message content rule may, when the rules indicate the emergency situation, use the remainder of the blocks first to transmit the emergency message and then any secondary information to be transmitted. The secondary information may be information about one of more of altitude, speed, and track of the vehicle. However, the message content rule may, when the rules do not indicate the emergency situation, use the remainder of the blocks first to transmit any priority messages (e.g., a historical position data message or a sub-message, as discussed below) and then any of the secondary information to be transmitted.

The message may be compiled to include a Vehicle ID, position (latitude, longitude, and/or altitude), time, airspeed, track, and/or an emergency message. Specifically, an emergency code may be included in the emergency message. The emergency code may be predefined to represent different type of emergencies, and the Vehicle ID, position (latitude, longitude, and/or altitude), time, airspeed, track may be transmitted in a position report message instead of the message or separate from the emergency message. For instance, based on the editable logic, if the first rule triggers the message transmission (e.g., start of time period), the message may be compiled to include the current time (e.g., a time of applicable transmission and vehicle Identifier, such as in time of applicability as defined in ADS-B) and the location (either fused or unfused location) of the vehicle. The message may also be compiled to include other information about one of more of altitude, speed, track, vertical rate, position accuracy, velocity accuracy, altitude accuracy, or attitude information of the vehicle in the message within the maximum size of the RDSS message, so as to abbreviate message content and accommodate important information in the limited bandwidth.

For instance, if any one of the second to seventh rules triggers the message transmission (i.e., an emergency transmission), the message may be compiled to include current time (e.g., a time of applicable transmission and vehicle Identifier, such as in time of applicability as defined in ADS-B), location of the vehicle, and an emergency message. The emergency message may include information about one or more of: an indicator of the vehicle, an indicator of phase of travel, an indicator of the user (e.g., pilot) and/or passengers, and/or an indicator of the situation. The indicator of the vehicle may include a vehicle identification number and/or a vehicle type. The indicator of the phase of travel may include one of departing terminal (e.g., take-off), in transit, loiter, arriving to terminal, search and rescue, and/or operations. The indicator of the user and/or passengers may include a number for each and/or names. The indicator of the situation may be based on which rule triggered the emergency transmission and/or a status of one or more systems of the vehicle (e.g., engine failure). Based on remaining available message space (based on the content size of the time, location, and emergency message with respect to the maximum RDSS message size), additional information about one of more of altitude, speed, and track of the vehicle may be included in the message.

As discussed below with respect to FIG. 9, the editable logic may enable a user of the vehicle communications system 115 to transmit messages other than the position reporting and/or the emergency messaging discussed above. For instance, the processor may output one or more pre-defined message templates to the user interface, and receive a user input from the user interface that indicates a selection by the user of at least one of the one or more pre-defined message templates. In response to receiving the user input for the selection, the processor may compile a message that includes a time, location, and a sub-message corresponding to the selected pre-defined message template. The sub-message may be configured so that the message may be less than or equal to the maximum RDSS message size. The pre-defined message templates may be based on situational scenarios, such as departing or approaching a terminal, passing within a threshold distance of a given location (e.g., a waypoint), and/or encountering expected or unexpected inclement weather or turbulence. Alternatively or in addition, one of the one or more pre-defined message templates may allow the user to input a text message to be transmitted. The text message may be entered by the user by inputs to the user interface.

The processor may encode and compress the positioning information (fused or not-fused positioning information) for storage and/or transmission. To compress the positioning information, the processor may compress the data by using compression algorithms. The compression algorithms may include lossy or lossless compression algorithms.

When compiling the message to be transmitted in response to a trigger of one of the above rules, the location included in the message may be based on the most currently received GNSS data or the most current compressed positioning information.

The processor, in the messages storage section 115d, may store the compressed positioning information that have or have not been transmitted, in the memory of the vehicle communications system 115. As a service frequency for each RDSS message may not be frequent enough to transmit all compressed positioning information, the processor may store compressed positioning information in the messages stored section 115d that have not been transmitted as historical positioning information. For instance, the historical positioning information may include compressed positioning information that is based on received GNSS data that was received between the start/end of the time periods for the first rule above (e.g., GNSS data received between each transmit phase of the vehicle communications system 115 or of the service frequency for each RDSS message). For instance, the processor may receive the positioning information based on the received GNSS data and compare a time of receipt for the received GNSS data with the start/end time of the time period timer, and if the time of receipt is more than a threshold time amount away from the start/end of the time period then the processor may store the positioning information as a part of the historical positioning information. Alternatively, the processor may receive the positioning information based on the received GNSS data, buffer all the received positioning information (buffer data) in a buffer or in a section of the memory, and after a message is transmitted with the most current time from the buffer data, save a remaining amount of the buffer data as a part of the historical positioning information, and refresh the buffer or the section of the memory (by, e.g., deleting the buffer data).

Furthermore, the stored historical positioning information may be based on received GNSS data for one or more time periods backwards in time from the most recent transmit phase, or the stored historical positioning information may be for an entire trip of the vehicle. The stored historical positioning information may be periodically deleted entirely and/or the stored historical positioning information may store the data on a first-in-first-out basis.

For instance, based on the editable logic, a historical location data message may be included in a message triggered by one of the above rules. For instance, whether to include the historical location data message may be based on (1) if the first rule above triggers the message transmission, (2) a different time period than the time period of the first rule (e.g., alternating with every other transmit phase of the first rule time period, or some integer multiple thereof), (3) a storage amount for the historical positioning information in the memory of vehicle communications system 115 (e.g., allocate a threshold data size and transmit if the historical positioning information is equal to or over the threshold data size), (4) if the message includes available space; (5) if a sub-message and a emergency message are not included in the message; and/or (6) if the any of rules two through seven above trigger the message transmission (e.g., a trigger for an emergency message would also trigger a historical location data message). The message may be compiled to include the current time and the location (either fused or unfused location) of the vehicle, and the historical location data message. The historical data message may be configured so that the message may be less than or equal to the maximum RDSS message size. For instance, the historical location data message may include a portion (up to all) of the stored historical positioning information. The historical location data message may include the most recent or the oldest stored historical positioning information. Alternatively, the historical location data message may include an evenly spaced sampling of a predefined period before the transmission of the historical location data message; for instance, if the historical positioning information includes positioning information for an entire trip of the vehicle, the historical location data message may include a fraction of discrete positioning information elements distributed across the entire trip or a period of time ending at the time of transmission. The processor may delete the portion of the stored historical positioning information on the memory of the vehicle communications system 115, after the historical location data message has been transmitted. The historical location data message may be included in the message in place of the configurable items (e.g., the blocks corresponding to the remainder of available blocks).

The at least one satellite communication transceiver 115f may include a transmitter and receiver or a transceiver that can transmit/receive signals to/from the one or more SAT-COM systems. The processor may send the compiled message to the at least one satellite communication transceiver 115f with instructions that the compiled message is to be transmitted, and the at least one satellite communication transceiver 115f may transmit the compiled message to a satellite (or satellites) corresponding to one of the one or more SATCOM systems (called downlink messages). The at least one satellite communication transceiver 115f may receive uplink messages, and transmit the uplink messages to the processor.

Figure 2:
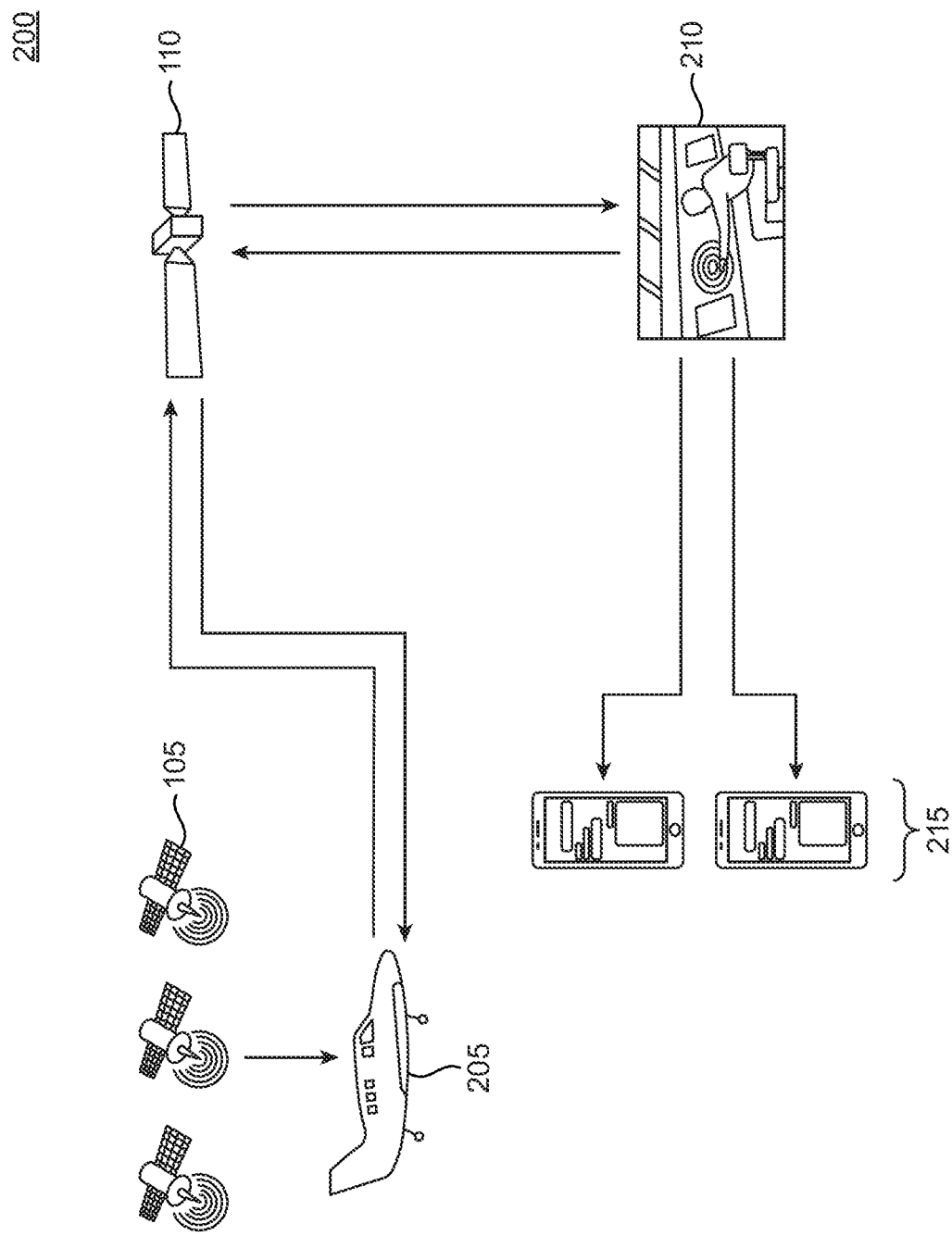
FIG. 2 depicts an exemplary system for vehicle information reporting, according to one or more embodiments.

FIG. 2 depicts an exemplary system for vehicle information reporting, according to one or more embodiments. The system 200 may include the one or more Global Navigation Satellite systems (GNSS) 105 and the satellite communication system 110 of FIG. 1 discussed above. Furthermore, the system 200 may include a vehicle 205, one or more ground stations 210, and one or more mobile devices 215.

Figure 3:
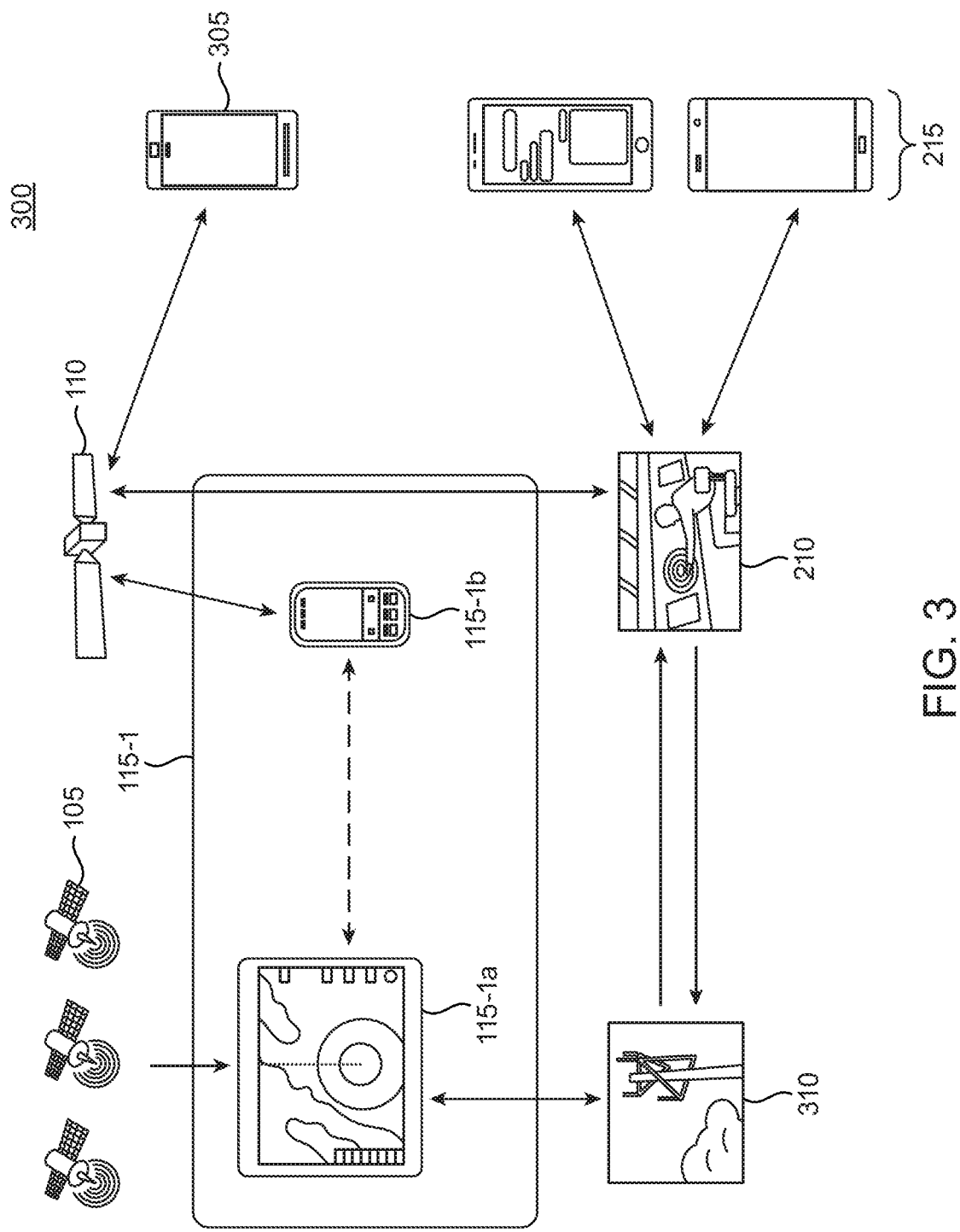
FIG. 3 depicts an exemplary system for vehicle information reporting, according to one or more embodiments.
Figure 6:
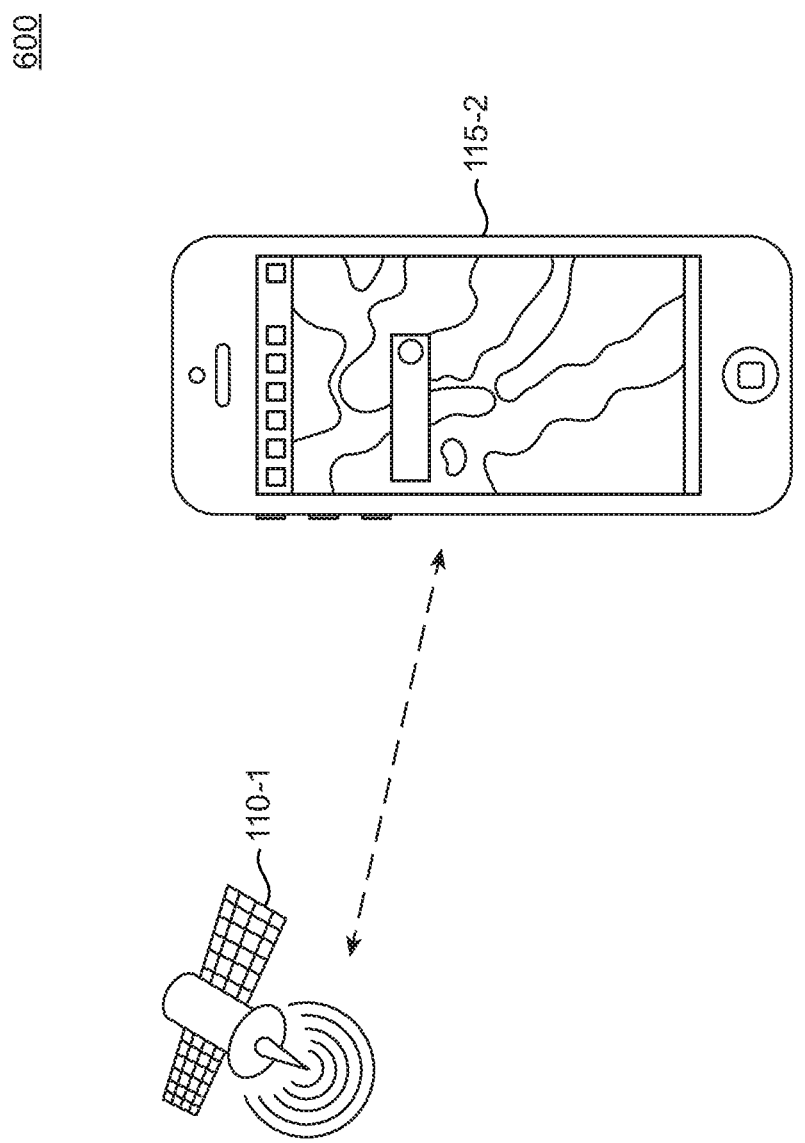
FIG. 6 depicts an exemplary system for vehicle information reporting, according to one or more embodiments.

The vehicle 205 may have the vehicle communications system 115 on-board, as depicted in FIG. 1, or have the vehicle communications system 115-1 or 115-2, as depicted in FIGS. 3 and 6, respectively. The vehicle 205 may be an aircraft, an automobile, a ship, or any other vehicle.

The one or more ground stations 210 may receive compiled messages (or downlink messages) from the vehicle communications system 115, 115-1, or 115-2, on the vehicle 205, and may transmit the uplink messages to the vehicle communications system 115, 115-1, or 115-2, on the vehicle 205. The one or more ground stations 210 may transmit information to the one or more mobile devices 215. The information may include position information about the vehicle 205, a notice about an emergency (based on the emergency message discussed above), a sub-message (based on the pre-defined message template discussed above), or historical positioning information (based on the historical location data message discussed above) corresponding to the vehicle 205. The one or more mobile devices 215 may receive the information from the one or more ground stations 210. The one or more mobile devices may transmit responses to the one or more ground stations 210 to be communicated to the vehicle 205 as uplink messages. The one or more mobile devices 215 and the one or more ground stations 210 may communicate over 3G/4G/5G wireless networks or wired networks, or by the internet.

FIG. 3 depicts an exemplary system for vehicle information reporting, according to one or more embodiments. The system 300 may include the one or more Global Navigation Satellite systems (GNSS) 105 and the satellite communication system 110 of FIG. 1, and the one or more ground stations 210 and the one or more mobile devices 215 of FIG. 2. Furthermore, the system 300 may include a vehicle communications system 115-1, a satellite mobile device 305, and a mobile communications networks 310.

The vehicle communications system 115-1 may be the same as the vehicle communications system 115 except the functions of the processor may be separated into two distinct physical devices. Specifically, the vehicle communications system 115-1 may include a first communication system 115-1a and a second communication system 115-1b. The first communication system 115-1a and the second communication system 115-1b may be communicatively coupled to each other by wireless (e.g., Bluetooth or Wi-Fi) or wired (e.g., Ethernet or USB) connections that are detachable.

The first communication system 115-la may be portable. The first communication system 115-1a may be an electronic flight bag (EFB) device. The first communication system 115-1a may include a user interface and the one or more GNSS receivers 115a, the GNSS data fusion section 115b, the encode downlink message section 115c, the messages storage section 115d, and the trigger section 115e of the vehicle communications system 115.

The second communication system 115-1b may be fixed to a vehicle, such as the vehicle 205. The second communication system 115-1b may include the at least one satellite communication transceiver 115f of the vehicle communications system 115. The second communication system 115-1b may be a BeiDou transceiver.

When a processor of the first communication system 115-la determines to transmit a compiled message, the processor of the first communication system 115-1a may transmit to the second communication system 115-1b the compiled message and an instruction to transmit the compiled message. The second communication system 115-1b may receive BeiDou GNSS data and uplink messages from the BeiDou system, and transmit the received BeiDou GNSS data and uplink messages to the first communication system 115-1a.

Alternatively, the second communication system 115-1b may include the one or more GNSS receivers 115a and the at least one satellite communication transceiver 115f, while the first communication system 115-1a may not have the one or more GNSS receivers 115a. In this configuration, the second communication system 115-1b may receive the GNSS data from the one or more sources, and transmit the received GNSS data to the first communication system 115-1a (either processed into positioning information or as raw data from the signal of the one or more sources).

The satellite mobile device 305 may receive downlink messages from/transmit uplink messages to the vehicle communications system 115-1 (or from the vehicle communications system 115 or the vehicle communications system 115-2). The satellite mobile device 305 may be a BeiDou phone that has a BeiDou transceiver.

The mobile communications networks 310 may transmit and receive information from the first communication system 115-1a and the one or more ground stations 210. For instance, the first communication system 115-1a may communicate with the one or more ground stations 210 using wireless (e.g., 3G/4G/5G) to the mobile communications networks 310; for instance the first communication system 115-la may transmit a flight plan before take off of an aircraft, a flight log after landing, and information regarding various conditions during flight. Further, the one or more ground stations 210 may transmit one or more of advisory information and/or weather information to the first communication system 115-1a.

Figure 4:
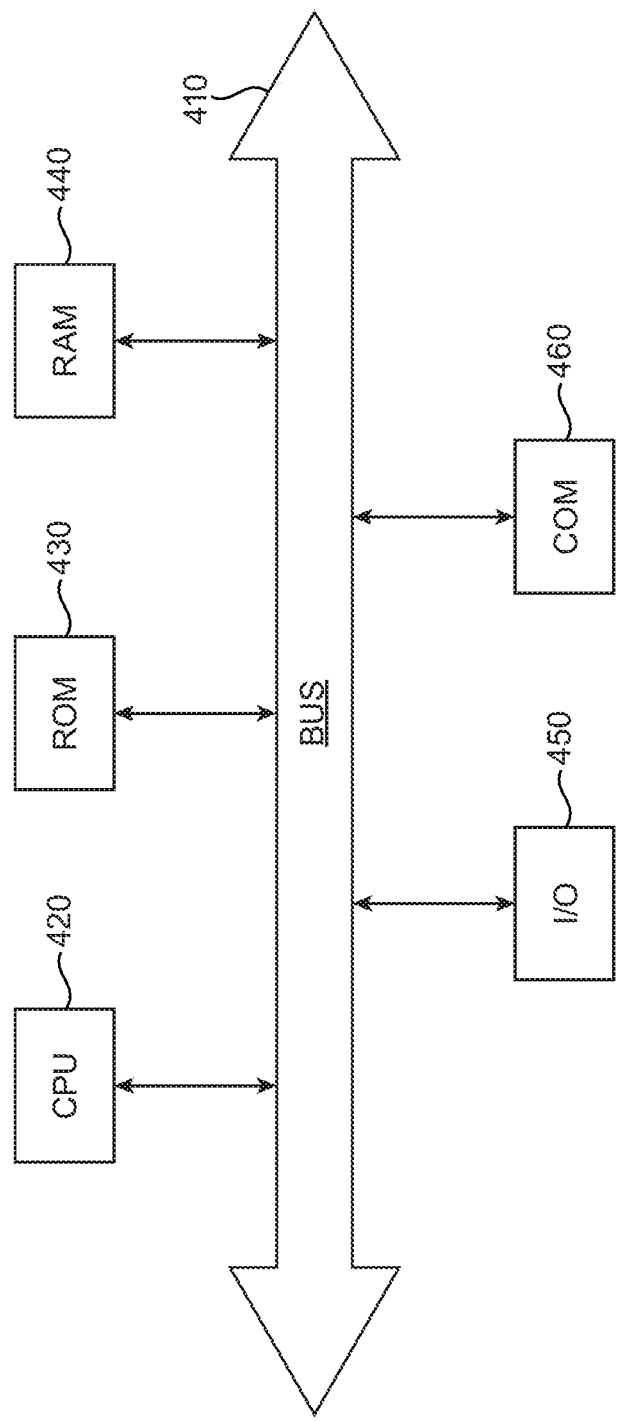
FIG. 4 depicts an example system that may execute techniques presented herein.

FIG. 4 depicts an example system that may execute techniques presented herein. FIG. 4 is a simplified functional block diagram of a computer that may be configured to execute techniques described herein, according to exemplary embodiments of the present disclosure. Specifically, the computer (or "platform" as it may not be a single physical computer infrastructure) may include a data communication interface 460 for packet data communication. The platform may also include a central processing unit ("CPU") 420, in the form of one or more processors, for executing program instructions. The platform may include an internal communication bus 410, and the platform may also include a program storage and/or a data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, mufti-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Figure 5:
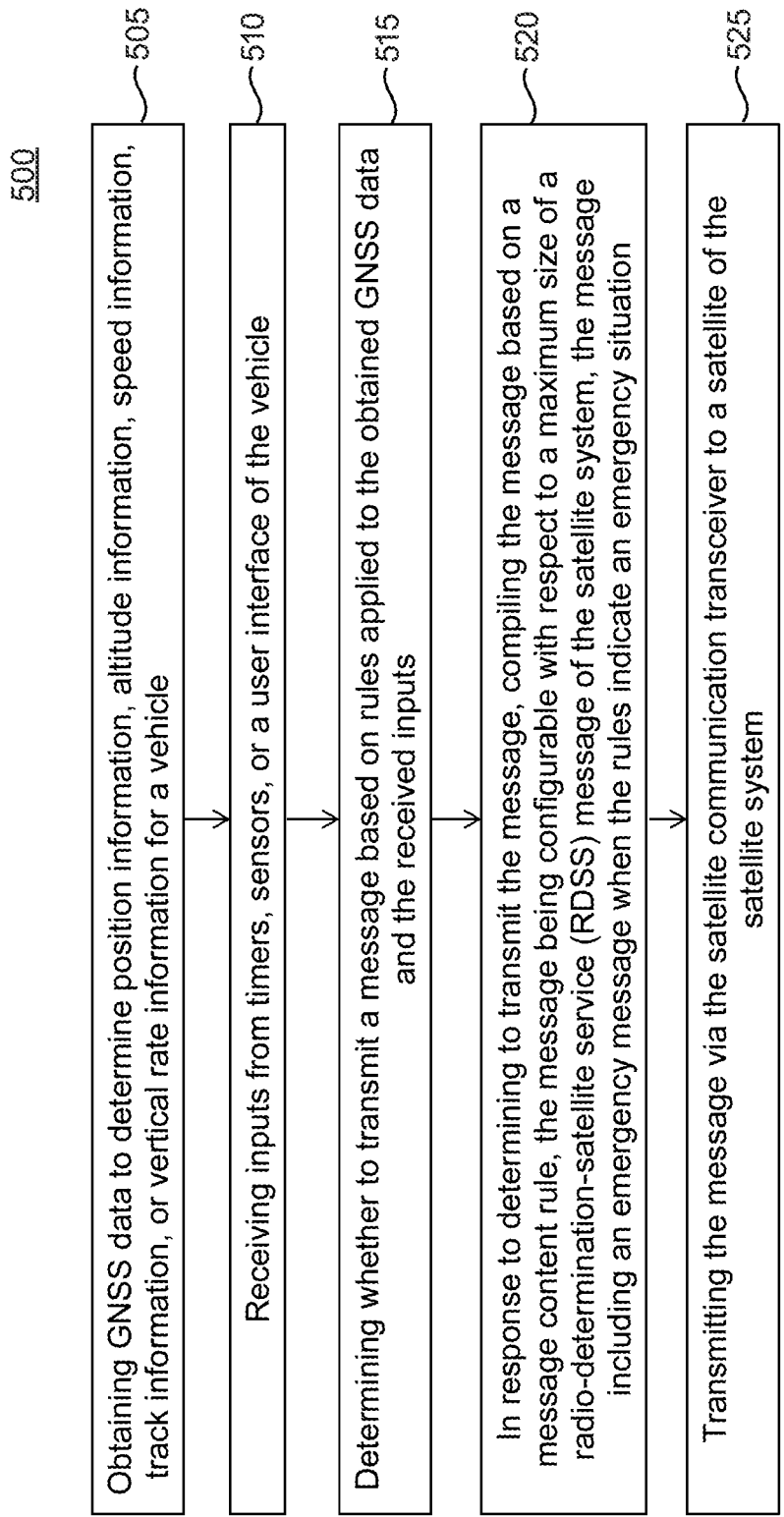
FIG. 5 depicts a flowchart for vehicle information reporting, according to one or more embodiments.

FIG. 5 depicts a flowchart for vehicle information reporting, according to one or more embodiments. In the flowchart 500, the process may start at block 505 by obtaining GNSS data to determine position information, altitude information, speed information, or track information for a vehicle, the obtained GNSS data being received by GNSS receivers. Then, the process may proceed to block 510 by receiving inputs from timers, sensors, or a user interface of the vehicle. Then, the process may proceed to block 515 by determining whether to transmit a message based on rules applied to the obtained GNSS data and the received inputs. Then, the process may proceed to block 520 by, in response to determining to transmit the message, compiling the message based on a message content rule, the message being configurable with respect to a maximum size of a radio-determination-satellite service (RDSS) message of the satellite system, the message including an emergency message when the rules indicate an emergency situation. Then, the process may proceed to block 525 by transmitting the message via a satellite communication transceiver to a satellite of the satellite system.

FIG. 6 depicts an exemplary system for vehicle information reporting, according to one or more embodiments. The system 600 may include a satellite communications and GNSS system 110-1 and a vehicle communications system 115-2. The satellite communications and GNSS system 110-1 may provide RNSS and RDSS services, like the BeiDou system. The vehicle communications system 115-2 may be the same as the vehicle communications system 115, except that the vehicle communications system 115-2 may transmit a compiled message to the satellite communications and GNSS system 110-1.

Figure 7:
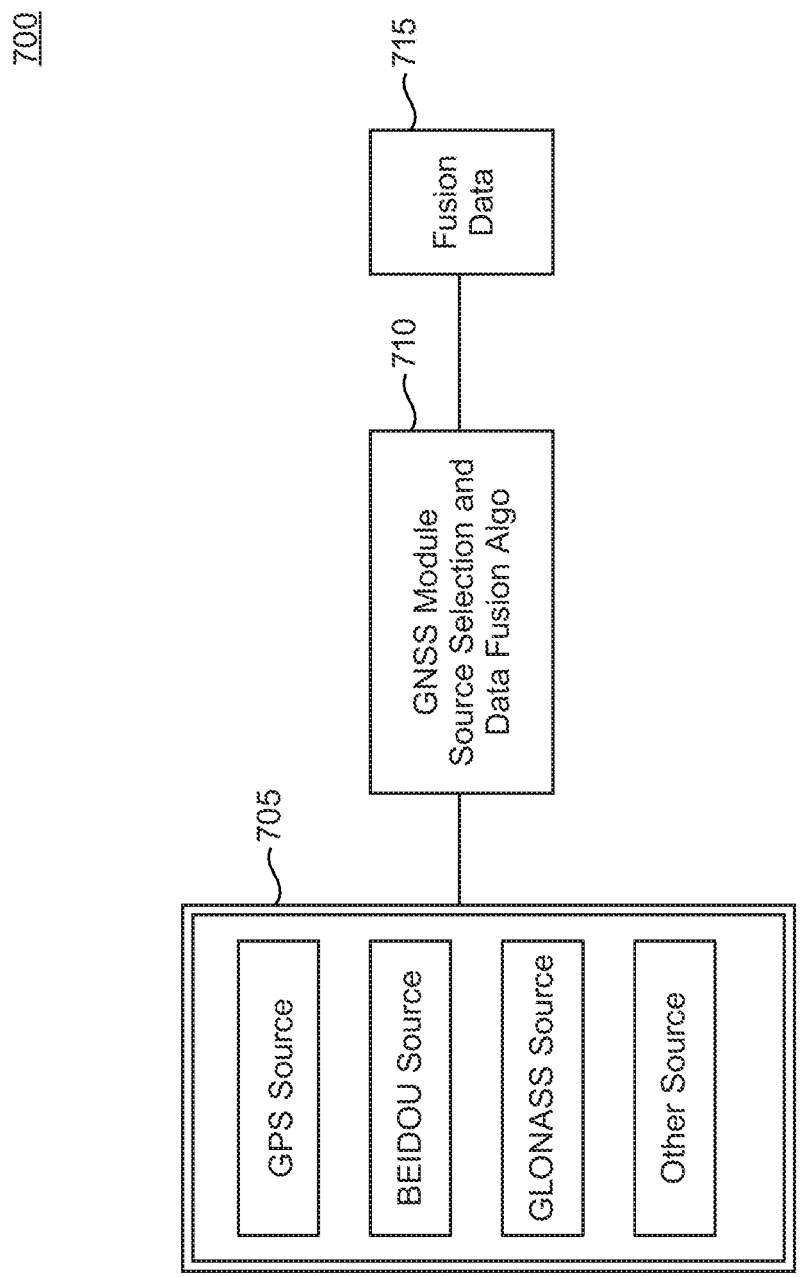
FIG. 7 depicts an exemplary block diagram of a system for vehicle information reporting, according to one or more embodiments.

FIG. 7 depicts an exemplary block diagram of a system for vehicle information reporting, according to one or more embodiments. The block diagram 700 may explain a process executed a processor the system to fuse positioning information, as discussed above with respect to FIG. 1. The block diagram 700 may include a one or more sources section 705, a source selection and data fusion section 710, and a fusion data section 715.

The processor, in the one or more sources section 705, may store received GNSS data from one or more sources in a memory of the system. The processor, in the source selection and data fusion section 710, may select the GNSS source (or sources) that (1) have a strongest signal strength, best line-of-sight, or longest exposure time in the visible sky to a respective receiver (based on location of the receiver, location of transmitting satellite, and speed and heading of each), and/or (2) a highest number of visible satellites to the respective receiver. Furthermore, the processor may fuse the positioning information of the selected sources by averaging the positioning information, by weighting respective sources based on precision of the source, etc. The processor, in the fusion data section 715, may store the fused positioning information in the memory of the system.

Figure 8:
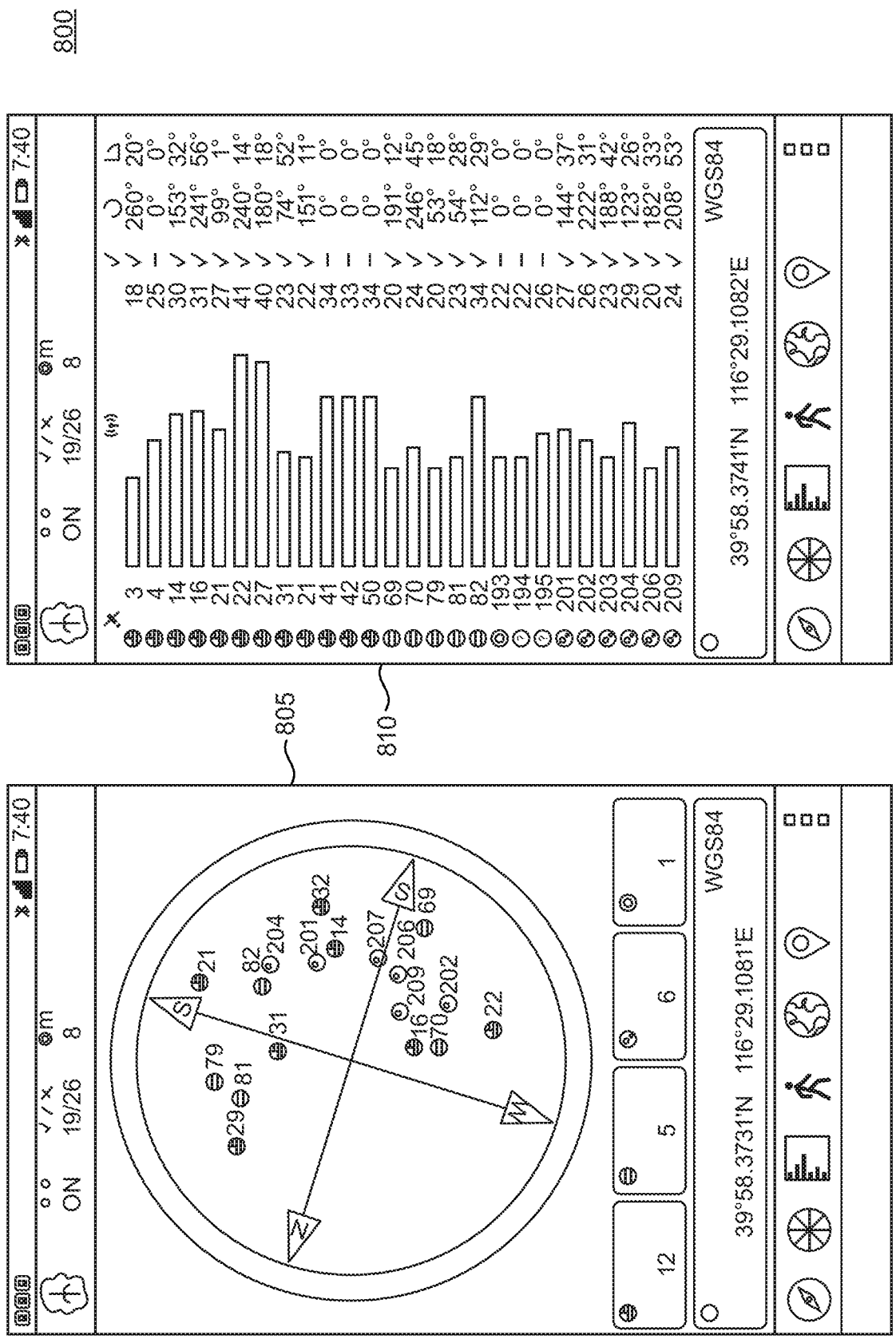
FIG. 8 depicts an exemplary graphical user interface to explain a function of a system for vehicle information reporting, according to one or more embodiments.

FIG. 8 depicts an exemplary graphical user interface to explain a function of a system for vehicle information reporting, according to one or more embodiments. As shown in FIG. 8, graphical user interface 800 includes a first GNSS sources display 805 or a second GNSS sources display 810. A user may toggle between the first GNSS sources display 805 and the second GNSS sources display 810 by a user input.

In the first GNSS sources display 805, the processor may display (1) a number of satellites for one or more (up to all) of available sources in categories associated with the available sources; (2) a relative position of the satellites for the one or more of available sources with respect to a position and a heading of the vehicle (as indicated by a compass for instance); (3) a position (e.g., latitude and longitude) based on a single source or a fused position (which may be determined in accordance with FIG. 7 above); (4) a number of usable satellite signals out of the number of satellites for the one or more of available sources; and/or (5) a precision level. For instance, in the first GNSS sources display 805, there may be twelve sources from the GPS system, six sources from the Beidou system, five sources from the GLONASS system, and one source from the Galileo system; nineteen of twenty six sources may be usable; and the precision level may be eight meters.

In the second GNSS sources display 810, the processor may display (1) signal data for the satellites for one or more (up to all) of available sources; (2) the position (e.g., latitude and longitude) based on a single source or a fused position (which may be determined in accordance with FIG. 7 above); (3) the number of usable satellite signals out of the number of satellites for the one or more of available sources; and/or (4) the precision level. The signal data may include one or more of a signal strength for each source, an indication of whether a signal is useable, and/or a satellite location (e.g., in polar coordinates) or look angles.

Figure 9:
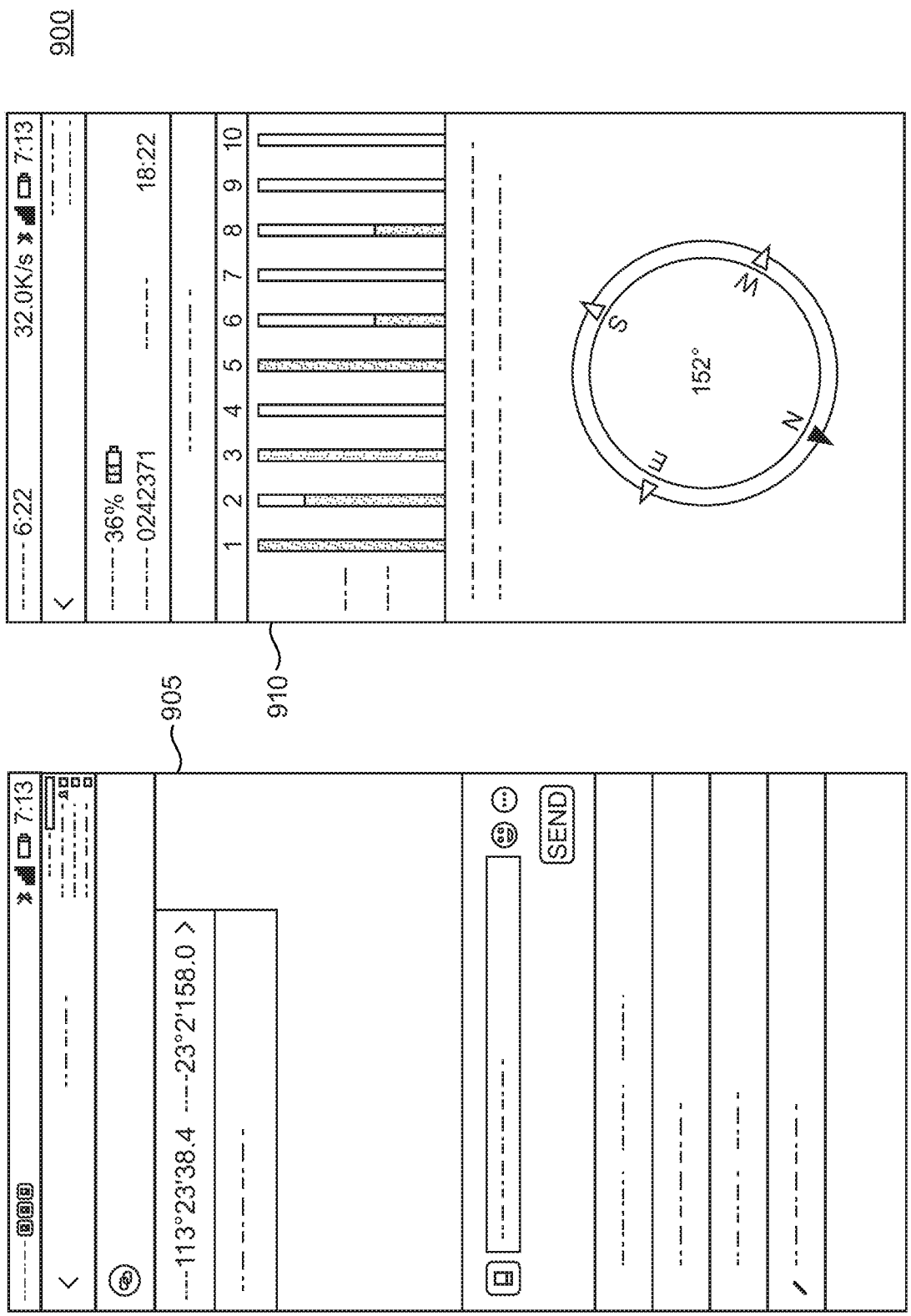
FIG. 9 depicts an exemplary graphical user interface to explain a function of a system for vehicle information reporting, according to one or more embodiments.

FIG. 9 depicts an exemplary graphical user interface to explain a function of a system for vehicle information reporting, according to one or more embodiments. As shown in FIG. 9, graphical user interface 900 includes a first message template display 905 or a second message template display 910.

In the first message template display 905, the processor may display one or more pre-defined message templates. The one or more pre-defined message templates may be based on situational scenarios, such departing or approaching a terminal, passing within a threshold distance of given location (e.g., a waypoint), encountering expected or unexpected inclement weather or turbulence. Alternatively or at the same time, one of the one or more pre-defined message templates may allow the user to input a text message to be transmitted. In the second message template display 910, the processor may display a result screen of transmitting the user selected message of the one or more pre-defined message templates.

Figure 10:
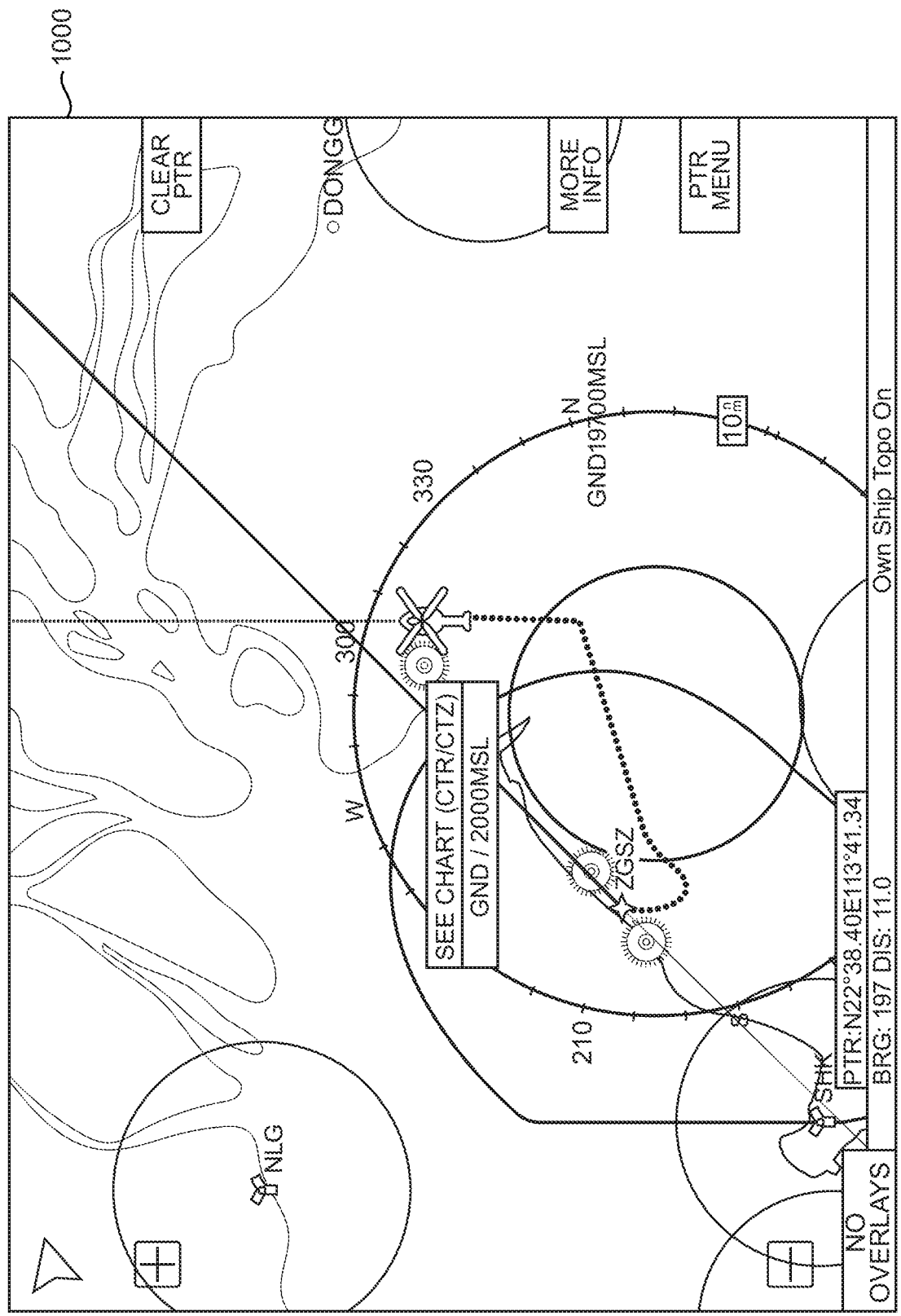
FIG. 10 depicts an exemplary graphical user interface to explain a function of a system for vehicle information reporting, according to one or more embodiments.

FIG. 10 depicts an exemplary graphical user interface to explain a function of a system for vehicle information reporting, according to one or more embodiments. As shown in FIG. 10, the graphical user interface may include a position tracking display 1000. In the position tracking display 1000, the processor may display a map of an area with a line that indicates a position of the vehicle from a first point to a second point and/or with a line that indicates a planned path of the vehicle. The first point may be a starting position and the second point may be a current position of the vehicle. Alternatively, based on a zoom level of the map, the first point may a position of the vehicle as it entered the displayed region of the map and the second point may the current position of the vehicle. In the position tracking display 1000, the line that indicates the position of the vehicle from a first point to a second point may be a larger dotted line and the line that indicates a planned path of the vehicle may a smaller dotted line. The current position of the vehicle may be indicated by a symbol to indicate the vehicle, e.g., a helicopter symbol. The zoom level of the map may be adjusted by a user input.

FIG. 11 depicts an exemplary graphical user interface to explain a function of a system for vehicle information reporting, according to one or more embodiments. As shown in FIG. 11, the graphical user interface 1100 may include a first local map display 1105 or a second local map display 1110. A user may toggle between the first local map display 1105 and the second local map display 1110 by a user input.

In the first local map display 1105, the processor may display the current position of the vehicle (with or with out the symbol to indicate the vehicle) on a map that displays streets of a surrounding region of the vehicle's current position. Furthermore, a heading of the vehicle and/or one or more indicator range may be displayed on the map. An indicator range may indicate how far away a portion of the map is from the current position of the vehicle, and the indicator range may be a circle or it may be some other shape, like a square, rectangle, or an arrow.

In the second local map display 1110, the processor may display the current position of the vehicle (with or with out the symbol to indicate the vehicle) on a map that displays a satellite view of the surrounding region of the vehicle's current position. Furthermore, the heading of the vehicle and/or the one or more indicator ranges may be displayed on the map.

Figure 12:
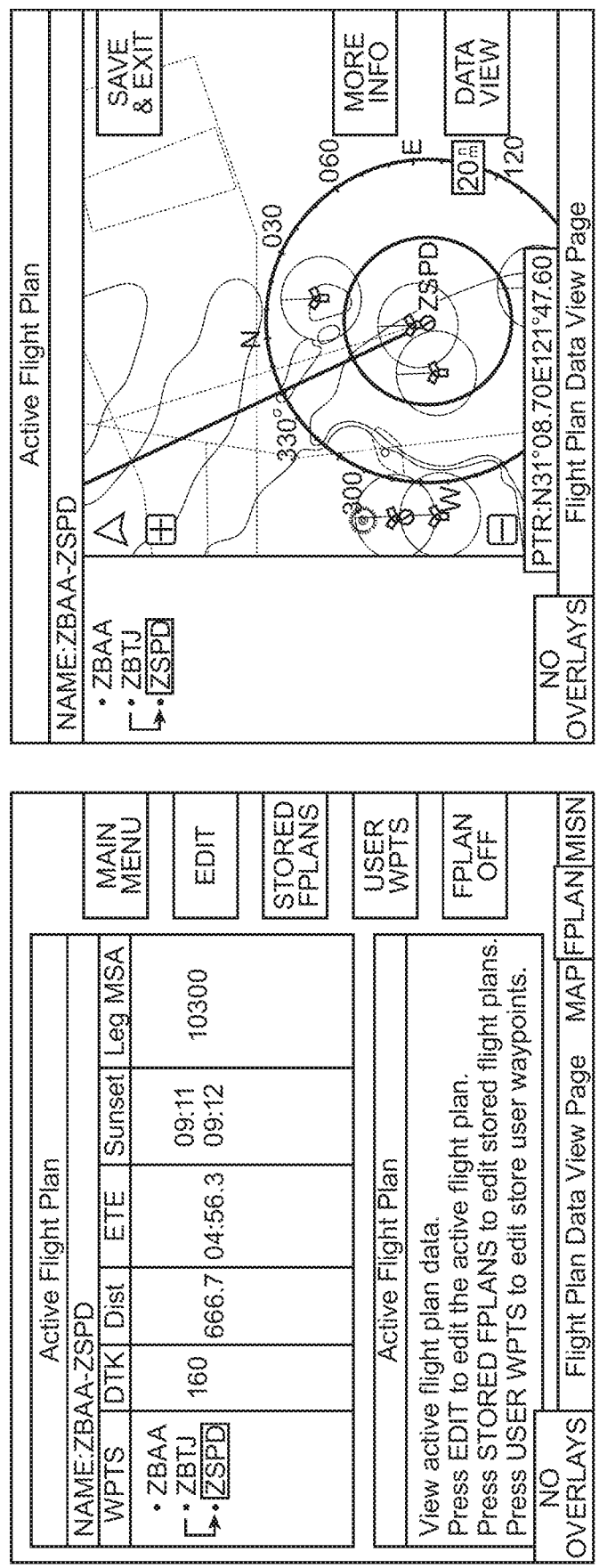
FIG. 12 depicts an exemplary graphical user interface to explain a function of a system for vehicle information reporting, according to one or more embodiments.

FIG. 12 depicts an exemplary graphical user interface to explain a function of a system for vehicle information reporting, according to one or more embodiments. As shown in FIG. 12, the graphical user interface 1200 may include a first uplink/downlink display 1205 or a second uplink/downlink display 1210.

In the first uplink/downlink display 1205 or the second uplink/downlink display 1210, the processor may display a flight plan, a flight log, or a weather/safety advisory (either near terminal or in transit). The flight plan, the flight log, or the weather/safety advisory may be uplinked to the vehicle or downlinked to an entity, like the ground station 210. The processor may uplink or downlink by using the SATCOM systems 110 and/or by 3G/4G/5G, when available. The flight plan, the flight log, or the weather/safety advisory may be displayed as either text information or graphical representation on a map. The user may toggle between the text-based display and the graphical display based on a user input. Specifically, in the first uplink/downlink display 1205 or the second uplink/downlink display 1210, the processor may display a flight plan; in the first uplink/downlink display 1205, the processor may display the flight plan in a text-based manner; in the second uplink/downlink display 1210, the processor may display the flight plan as a graphical representation on a map.

Figure 13:
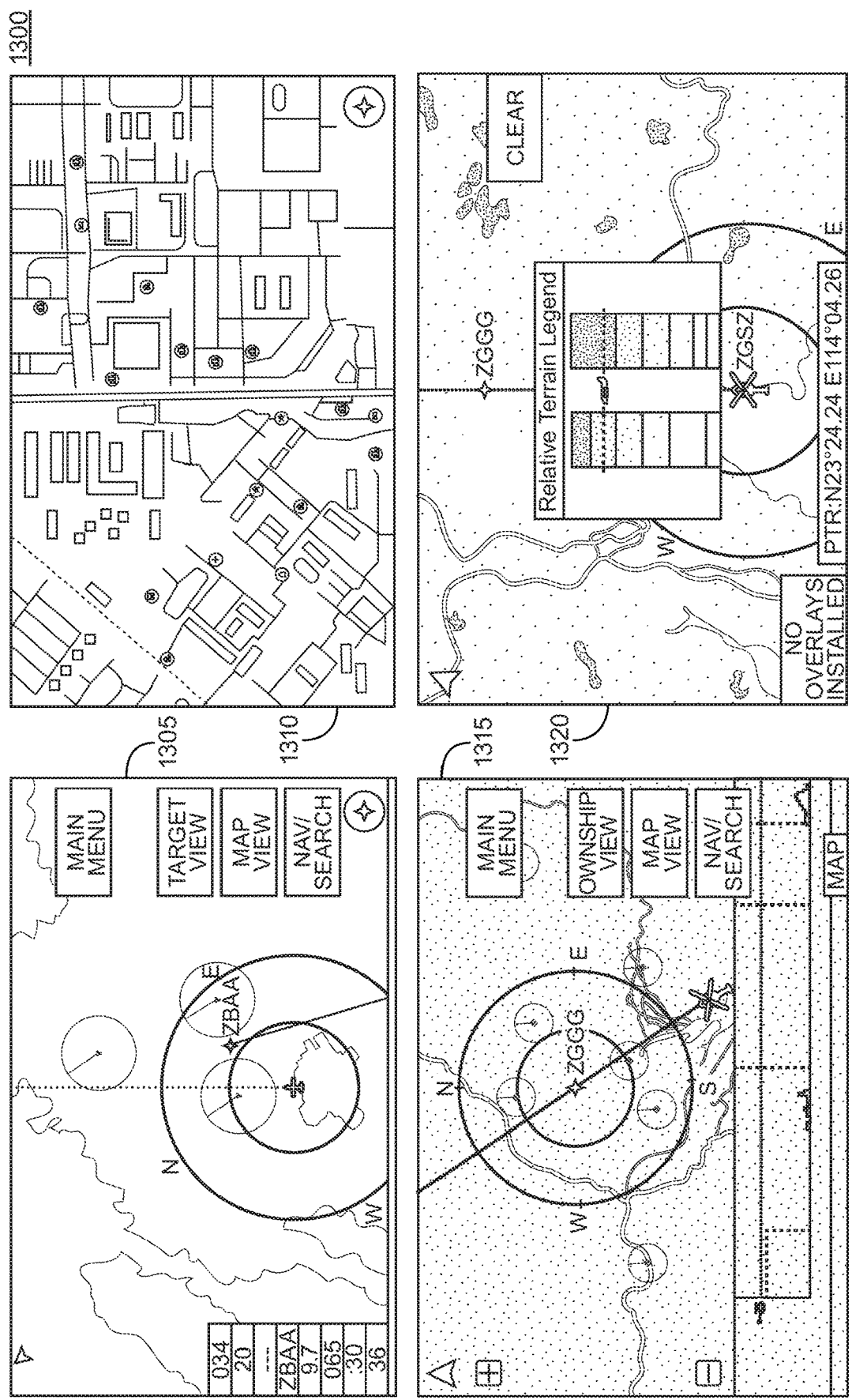
FIG. 13 depicts an exemplary graphical user interface to explain a function of a system for vehicle information reporting, according to one or more embodiments.

FIG. 13 depicts an exemplary graphical user interface to explain a function of a system for vehicle information reporting, according to one or more embodiments. As shown in FIG. 13, the graphical user interface 1300 may include a first moving map display 1305, a second moving map display 1310, a third moving map display 1315, or a fourth moving map display 1320. A user may toggle between first moving map display 1305, a second moving map display 1310, a third moving map display 1315, or a fourth moving map display 1320 by a user input.

In the first moving map display 1305, the processor may display a satellite view of a map of a region around a vehicle that moves with a current position of the vehicle. In the second moving map display 1310, the processor may display a street layout view of a map of a region around a vehicle that moves with a current position of the vehicle. In the third moving map display 1315, the processor may display a contrast view of a map of a region around a vehicle that moves with a current position of the vehicle. The contrast view may include water versus ground contrast. In the fourth moving map display 1320, the processor may display a relative terrain map of a region around a vehicle that moves with a current position of the vehicle. The relative terrain map may include relative elevations of the general terrain (e.g., ground elevations) of the region and/or of obstacles within the region. For instance, the relative terrain map may include at least two elevations and the relative terrain map may include an indicator of the current altitude of the vehicle with respect to the at least two elevations.

FIG. 14 depicts an exemplary graphical user interface to explain a function of a system for vehicle information reporting, according to one or more embodiments.

As shown in FIG. 14, the graphical user interface 1400 may include a first flight planning map display 1405, a second flight planning map display 1410, a third flight planning map display 1415, or a fourth flight planning map display 1420. In the first flight planning map display 1405, the second flight planning map display 1410, the third flight planning map display 1415, and the fourth flight planning map display 1420, the processor may display any one of the above maps, and generate planned routes of the vehicle based on a user input. For instance, the user input may select a pre-defined route from a set of pre-defined routes. The pre-defined routes may be based on standard routes for a given type of operation, parameters of the vehicle, and/or local information. For instance, in first flight planning map display 1405 and the second flight planning map display 1410, the pre-defined routes selected by the user may be a search & research pattern that takes into account a vehicle range and/or likely locations to search, a route between different terminals (e.g., airports), or a route for a tour of an area. Alternatively or in addition to the pre-defined routes, the user input may create a custom route plan based on a user input that indicates a start point, an end point, and/or any in-between ways points, or the user may input modifications to one of the pre-defined routes. Based on the user input, the processor may update or create a route plan for the vehicle. For instance, in third flight planning map display 1415 and the fourth flight planning map display 1420, the user may have entered inputs to create and/or modify pre-defined routes.

In any of maps discussed above, symbols associated with local entities (e.g., cities or airports) located within a map viewing area may be displayed in accordance with the location of the local entities.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for vehicle information reporting using Global Navigation Satellite System (GNSS) receivers and a satellite communication transceiver for a satellite system of a vehicle:
 obtaining GNSS data to determine position information, altitude information, speed information, track information, or vertical rate information for the vehicle, the obtained GNSS data being received by the GNSS receivers;
 receiving inputs from timers, sensors, or a user interface of the vehicle;
 determining whether to transmit a message based on rules applied to the obtained GNSS data and the received inputs;
 in response to determining to transmit the message, compiling the message based on a message content rule, the message being configurable with respect to a maximum size of a radio-determination-satellite service (RDSS) message of the satellite system, the message including an emergency message when the rules indicate an emergency situation; and
 transmitting the message via the satellite communication transceiver to a satellite of the satellite system.

2. The method of claim 1, wherein the rules trigger a transmission of the message based on a time period or the emergency situation.

3. The method of claim 2, wherein the rules indicate the emergency situation based on a user input, a ground speed of the vehicle, a course deviation of the vehicle, an acceleration of the vehicle, or a stall condition of the vehicle.

4. The method of claim 3, wherein the user input is received by the user interface and indicates the vehicle is in the emergency situation, and the user input is input by a functional key.

5. The method of claim 3, further comprising:
 before transmitting the message and in response to the rules indicating the emergency situation, outputting a countdown to the user interface;
 if no user input is received before the countdown ends, transmitting the message with the emergency message; and
 if a user input is received before the countdown ends, transmitting the message without the emergency message.

6. The method of claim 1, wherein the message includes a plurality of bocks,
 a first set of blocks correspond to a current time at transmission and a location of the vehicle,
 a second set of blocks correspond to a remainder of the plurality of blocks,
 the remainder of the plurality of blocks are configured to be changed based on the message content rule,
 when the rules indicate the emergency situation, the message content rule uses the remainder of the blocks first to transmit the emergency message and then any secondary information to be transmitted, and
 when the rules do not indicate the emergency situation, the message content rule uses the remainder of the blocks first to transmit any priority messages and then any of the secondary information to be transmitted.

7. The method of claim 1, wherein the vehicle is an aircraft,
 the GNSS receivers are included in an electronic flight bag (EFB) device that is portable,
 the satellite communication transceiver is included in a separate device from the EFB device that is fixed to the vehicle, and
 the EFB device communicates with the separate device to transmit the message.

8. An on-board communications device for vehicle information reporting of a vehicle, the on-board communications device comprising:
 a memory storing instructions; and
 a processor executing the instructions to perform a process including:

obtaining GNSS data to determine position information, altitude information, speed information, track information, or vertical rate information for the vehicle, the obtained GNSS data being received by the GNSS receivers;

receiving inputs from timers, sensors, or a user interface of the vehicle;

determining whether to transmit a message based on rules applied to the obtained GNSS data and the received inputs;

in response to determining to transmit the message, compiling the message based on a message content rule, the message being configurable with respect to a maximum size of a radio-determination-satellite service (RDSS) message of the satellite system, the message including an emergency message when the rules indicate an emergency situation; and transmitting the message via the satellite communication transceiver to a satellite of the satellite system.

9. The on-board communications device of claim 8, wherein the rules trigger a transmission of the message based on a time period or the emergency situation.

10. The on-board communications device of claim 9, wherein the rules indicate the emergency situation based on a user input, a ground speed of the vehicle, a course deviation of the vehicle, an acceleration of the vehicle, or a stall condition of the vehicle.

11. The on-board communications device of claim 10, wherein the user input is received by the user interface and indicates the vehicle is in the emergency situation, and the user input is input by a functional key.

12. The on-board communications device of claim 10, wherein the processor further includes:

before transmitting the message and in response to the rules indicating the emergency situation, outputting a countdown to the user interface;

if no user input is received before the countdown ends, transmitting the message with the emergency message; and if a user input is received before the countdown ends, transmitting the message without the emergency message.

13. The on-board communications device of claim 8, wherein the message includes a plurality of bocks, a first set of blocks correspond to a current time at transmission and a location of the vehicle, a second set of blocks correspond to a remainder of the plurality of blocks, the remainder of the plurality of blocks are configured to be changed based on the message content rule, when the rules indicate the emergency situation, the message content rule uses the remainder of the blocks first to transmit the emergency message and then any secondary information to be transmitted, and when the rules do not indicate the emergency situation, the message content rule uses the remainder of the blocks first to transmit any priority messages and then any of the secondary information to be transmitted.

14. The on-board communications device of claim 8, wherein the vehicle is an aircraft, the GNSS receivers are included in an electronic flight bag (EFB) device that is portable, the satellite communication transceiver is included in a separate device from the EFB device that is fixed to the vehicle, and the EFB device communicates with the separate device to transmit the message.

15. A non-transitory computer-readable medium storing instructions that, when executed by an on-board communications device, cause the on-board communications device to perform a method for vehicle information reporting of a vehicle, the method comprising:

obtaining GNSS data to determine position information, altitude information, speed information, track information, or vertical rate information for the vehicle, the obtained GNSS data being received by the GNSS receivers;

receiving inputs from timers, sensors, or a user interface of the vehicle;

determining whether to transmit a message based on rules applied to the obtained GNSS data and the received inputs;

in response to determining to transmit the message, compiling the message based on a message content rule, the message being configurable with respect to a maximum size of a radio-determination-satellite service (RDSS) message of the satellite system, the message including an emergency message when the rules indicate an emergency situation; and transmitting the message via the satellite communication transceiver to a satellite of the satellite system.

16. The non-transitory computer-readable medium of claim 15, wherein the rules trigger a transmission of the message based on a time period or the emergency situation.

17. The non-transitory computer-readable medium of claim 16, wherein the rules indicate the emergency situation based on a user input, a ground speed of the vehicle, a course deviation of the vehicle, an acceleration of the vehicle, or a stall condition of the vehicle.

18. The non-transitory computer-readable medium of claim 17, wherein the user input is received by the user interface and indicates the vehicle is in the emergency situation, and the user input is input by a functional key.

19. The non-transitory computer-readable medium of claim 15, wherein the message includes a plurality of bocks, a first set of blocks correspond to a current time at transmission and a location of the vehicle, a second set of blocks correspond to a remainder of the plurality of blocks, the remainder of the plurality of blocks are configured to be changed based on the message content rule, when the rules indicate the emergency situation, the message content rule uses the remainder of the blocks first to transmit the emergency message and then any secondary information to be transmitted, and when the rules do not indicate the emergency situation, the message content rule uses the remainder of the blocks first to transmit any priority messages and then any of the secondary information to be transmitted.

20. The non-transitory computer-readable medium of claim 15, wherein the vehicle is an aircraft, the GNSS receivers are included in an electronic flight bag (EFB) device that is portable, the satellite communication transceiver is included in a separate device from the EFB device that is fixed to the vehicle, and the EFB device communicates with the separate device to transmit the message.

* * * * *

UNITED STATES PATENT AND TRADEMARK OFFICE
CERTIFICATE OF CORRECTION

PATENT NO. : 10,645,561 B1  
APPLICATION NO. : 16/260493  
DATED : May 5, 2020  
INVENTOR(S) : Wen Fan Guo et al.

Page 1 of 1

It is certified that error appears in the above-identified patent and that said Letters Patent is hereby corrected as shown below:

In the Claims

Column 18 Line 38 In Claim 6, delete "bocks," and insert --blocks,--.

Column 19 Line 44 In Claim 13, delete "bocks," and insert --blocks,--.

Column 20 Line 40 In Claim 19, delete "bocks," and insert --blocks,--.

Signed and Sealed this  
Eighth Day of December, 2020

Andrei Iancu  
*Director of the United States Patent and Trademark Office*